May 15, 1934.   R. M. HEINTZ   1,958,752
ALTERNATOR MOUNTING
Filed Dec. 9, 1932
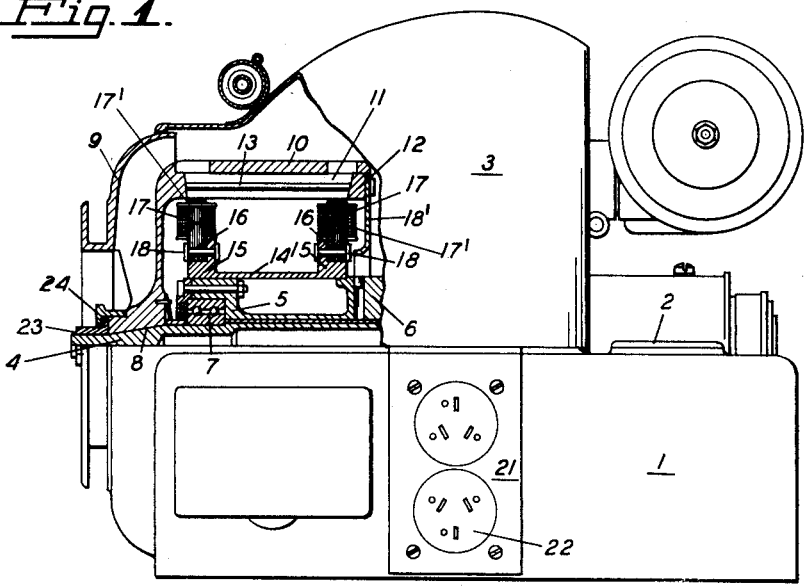
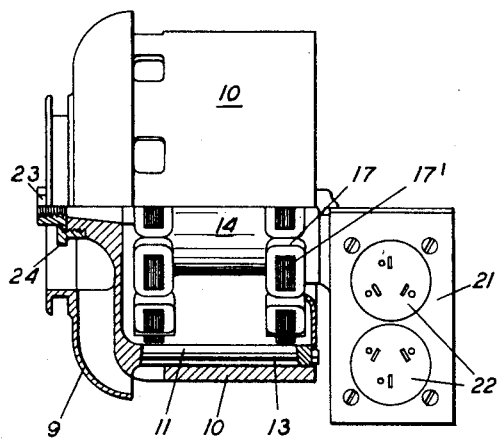
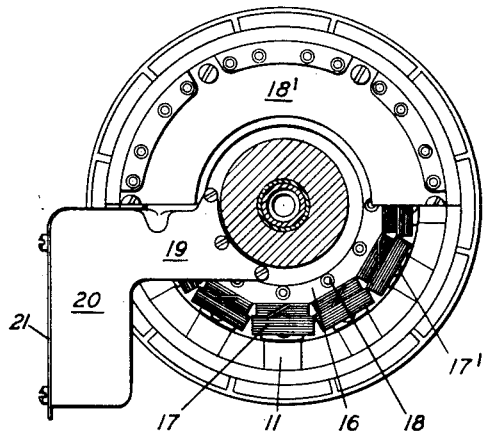
INVENTOR,
RALPH M. HEINTZ.
BY Donald R. Lippincott
ATTORNEY Patented May 15, 1934

1,958,752

UNITED STATES PATENT OFFICE 1,958,752

ALTERNATOR MOUNTING

Ralph M. Heintz, Palo Alto, Calif., assignor to Heintz & Kaufman, Ltd., San Francisco, Calif., a corporation of Nevada Application December 9, 1932, Serial No. 646,405

6 Claims. (Cl. 171—252)

My invention relates to an alternator mounting, and more particularly to means for mounting the field and armature of an inductor alternator so that they may be removed from the driving mechanism as a unit.

Among the objects of my invention are: to provide an alternator of simple construction; to provide means for dismounting an inductor alternator as a unit; to provide means for removing the field and armature of an alternator from its driving mechanism without disturbing the inductive relation of the armature coils and the field magnets; and to provide means whereby an alternator may be dismounted without breaking the magnetic circuits.

Other objects of my invention will be apparent or will be specifically pointed out in the description forming a part of this specification, but I do not limit myself to the embodiment of my invention herein described, as various forms may be adopted within the scope of the claims.

In the drawing, which illustrates a preferred embodiment of my invention:

Figure 1 is a longitudinal view partly in section and partly in elevation of an alternator as mounted in conjunction with a driving mechanism.

Figure 2 is a longitudinal view partly in section and partly in elevation of the alternator as removed from the driving mechanism.

Figure 3 is a face view partly in section showing the relationship of parts.

In small generating units, particularly in units which employ alternators in which the magnetic flux is supplied by permanent magnets, it is often necessary to dismount the alternator, as in case where repairs are necessary. As small portable units such as are here to be described are often used on exploratory expeditions far from shop facilities, it is of extreme importance that such alternators be dismountable in such a fashion that the inductive relation of the armature coils and the inductor magnets be not disturbed, as it is well known that a charged magnet loses a portion of its magnetism when the magnetic circuit is broken the first time after the magnet is charged.

In its broadest aspect, my invention comprises an alternator in which the magnets are attached to a rotating frame which encloses the armature coils. I then provide means for causing the stationary armature coils to be retained within the rotating frame when the rotating frame is dismounted, so that the inductive relationship is never disturbed, nor the magnetic circuit broken. I am therefore able to dismount the entire unit in the field without losing magnetic efficiency or having to recharge magnets, the recharging being a difficult if not impossible task remote from civilization.

Referring to the drawing, a foundation casting 1 is used both as a fuel tank filled through a port 2 and as a base for an internal combustion engine, here indicated as being enclosed in the air-hood 3. As my invention is applicable to any or all known driving mechanisms, I have not shown the engine in detail.

A shaft 4 driven by the engine, extends through a concentric sleeve 5 which may, in the case of a direct drive, project from the crank case 6 of the engine. The shaft is centered in the sleeve by a roller bearing 7, and extends beyond the sleeve, ending in a taper 8.

Mounted on the tapered end of the shaft is a flywheel 9, also serving as a blower to cool the engine in this particular embodiment, the flywheel extending back over the shaft to form a rotating frame 10. Firmly attached to this frame is an evenly spaced series of bar magnets 11 held in place by a clamp ring 12 tightened by bolts 13. The magnets extend parallel to the drive-shaft and sleeve.

Slidably mounted on the concentric sleeve 5 is a cylindrical stationary frame 14 provided at each end with an armature support-rings 15—15, each ring carrying a laminated core assembly 16 which supports armature coils 17 wound on projecting cores 17'. These assemblies are fastened to the rings by core bolts 18.

I prefer to make the cylindrical stationary frame a rather close and tight fit on the concentric sleeve 5 so that it will be frictionally held when in place, but removable under moderate pressure.

It is also to be noted that each ring of armature coils is in inductive relation to the opposite ends of bar magnet, with just enough clearance between the magnets and the core assembly projections to allow free rotation, and the cores, through the core assembly, act as keepers for the magnets when the generator is at rest.

At the rear of the rotating frame, and held to the frame by the heads of the bolts 13 is a circular retaining plate 18' extending toward the concentric sleeve and where cut out for the concentric sleeve is inwardly bent to closely approach the stationary frame adjacent the bolts. As this plate rotates and the bolts do not, a small clearance is provided.

Firmly fastened to the inner portion of the stationary frame, is a laterally extended, hollow conduit arm 19, terminating in an outlet box 20 having a face-plate 21 carrying outlet receptacles 22. The connections from the armature coils are brought out through this conduit to the receptacles. The face-plate is positioned flush with the side of the foundation casting, and the conduit arm and outlet box fit into a depression formed in the casting.

To remove the generator, a lock-nut 23 which holds the flywheel on the shaft, is loosened. This nut is flanged, the flange bearing on a flywheel cap 24 when unscrewed, to free the flywheel from its taper contact with the shaft. The air-hood 3 is removed and the conduit arm with its terminal outlet box is rotated upwardly out of its depression until the arm clears the foundation casting.

Continued forward movement of the flywheel on the shaft then brings the edge of the retainer plate to bear on the bolt heads of the stationary frame and still further forward movement of the flywheel will cause the stationary frame to slide off the concentric sleeve, being maintained inside the rotating frame.

When completely removed, the alternator will be a unit, as shown in Figure 2. The coils will be in their same inductive relation to the magnets, and the core assembly projections will remain in their magnetic relation as keepers for the bar magnet so that the magnetic circuit will not be broken.

To replace, the unit is started on the sleeve and shaft. When the flywheel is snug on the taper, the conduit arm is used to pull the stationary frame into its final position, is rotated downwardly into its depression, and the air-hood replaced. The air-hood is fastened down by means, not shown, and prevents accidental movement of the conduit arm in use.

While I have described the invention as applied to a small portable generating unit, it may obviously be applied to any type of driving mechanism of any power.

I claim:

1. In combination, a driven shaft, a concentric sleeve enclosing said shaft, a rotating frame mounted on said shaft, a plurality of magnets mounted on said frame, a stationary frame slidably mounted on said sleeve, a plurality of armature coils mounted on said stationary frame in inductive relation to said magnets, said stationary frame being positioned completely within said rotating frame, and means attached to said rotating frame and engageable with said stationary frame whereby said stationary frame may be removed from said sleeve as a unit with said rotating frame when said rotating frame is dismounted from said shaft.

2. In combination, a driven shaft, a concentric sleeve enclosing said shaft, a rotating frame mounted on said shaft, a plurality of magnets mounted on said frame, a stationary frame slidably mounted on said sleeve, a plurality of armature coils mounted on said stationary frame in inductive relation to said magnets, said stationary frame being positioned completely within said rotating frame, and means attached to said rotating frame normally out of contact with said stationary frame and engageable therewith to cause said stationary frame to be slidably removed when said rotating frame is dismounted from said shaft.

3. In combination, a driven shaft, a concentric sleeve enclosing said shaft, a rotating frame mounted on said shaft, a plurality of magnets mounted on said frame, a stationary frame slidably mounted on said sleeve, a plurality of armature coils mounted on said stationary frame in inductive relation to said magnets, said stationary frame being positioned completely within said rotating frame, and means for removing said frames from said shaft, and sleeve without disturbing the inductive relation of said coils with said magnets.

4. In combination, a driving unit, a shaft driven by said unit, a concentric sleeve enclosing said shaft, a rotating frame mounted on said shaft, a plurality of magnets mounted on said frame, a stationary frame slidably mounted on said sleeve, a plurality of armature coils mounted on said stationary frame in inductive relation to said magnets, said stationary frame being positioned completely within said rotating frame, and means attached to said rotating frame and engageable with said stationary frame whereby said stationary frame may be removed from said sleeve as a unit with said rotating frame when said rotating frame is dismounted from said shaft.

5. In combination, a driving unit, a shaft driven by said unit, a concentric sleeve extending from said unit and enclosing said shaft, a rotating frame mounted on said shaft, a plurality of magnets mounted on said frame, a stationary frame slidably mounted on said sleeve, a plurality of armature coils mounted on said stationary frame in inductive relation to said magnets, said stationary frame being positioned completely within said rotating frame, and means attached to said rotating frame and engageable with said stationary frame whereby said stationary frame may be removed from said sleeve as a unit with said rotating frame when said rotating frame is dismounted from said shaft.

6. In combination, a driving unit, a shaft driven by said unit, a concentric sleeve extending from said unit and enclosing said shaft, bearings between said shaft and said sleeve, a rotating frame mounted on said shaft, a plurality of magnets mounted on said frame, a stationary frame slidably mounted on said sleeve, a plurality of armature coils mounted on said stationary frame in inductive relation to said magnets, said stationary frame being positioned completely within said rotating frame, and means attached to said rotating frame and engageable with said stationary frame whereby said stationary frame may be removed from said sleeve as a unit with said rotating frame when said rotating frame is dismounted from said shaft.

RALPH M. HEINTZ.